(12) United States Patent
Chen et al.

(10) Patent No.: US 6,784,581 B1
(45) Date of Patent: Aug. 31, 2004

(54) MAGNETIC FLOATING BEARING OF A FAN, WHICH LOCATES ROTARY SHAFT BY MEANS OF DISTRIBUTION OF MAGNETIC FORCE

(76) Inventors: Cheng-Kang Chen, No. 2-6, Alley 11, Lane 109, Hwa-Hsin Street, Chung-Ho City, Taipei Hsien (TW); Chien-Chun Yu, No. 147-5, Ming-Shen Road, Tai-Shan Hsiang, Taipei Hsien (TW)

( * ) Notice: Subject to any disclaimer, the term of this patent is extended or adjusted under 35 U.S.C. 154(b) by 0 days.

(21) Appl. No.: 10/390,737

(22) Filed: Mar. 19, 2003

(51) Int. Cl.[7] .............................. H02K 7/09; F16C 32/05
(52) U.S. Cl. ............................................... 310/90.5
(58) Field of Search .................. 310/90.5; H02K 7/09; F16C 32/05

(56) References Cited

U.S. PATENT DOCUMENTS 5,280,208 A * 1/1994 Komura ...................... 310/90

FOREIGN PATENT DOCUMENTS

| JP | 54-1339007 | * 10/1979 | ............ H02K/7/08 |
| JP | 361269118 A | * 11/1986 | ............ H02K/7/09 |
| JP | 401260301 | * 10/1989 | ............ F16C/32/04 |

* cited by examiner

*Primary Examiner*—Burton S. Mullins
*Assistant Examiner*—Iraj A. Mohandesi
(74) *Attorney, Agent, or Firm*—Rosenberg, Klein & Lee

(57) ABSTRACT

A magnetic floating bearing of a fan includes an outer magnetic ring formed with a central axial through hole and an upper and a lower ends of the wall of the through hole having a magnetic strength greater than that of a center of the wall. An inner magnetic ring formed with a central axial fitting hole in which a rotary shaft is snugly fitted. The polarity of an outer circumferential wall of the inner magnetic ring is identical to the polarity of the wall of the through hole of the outer magnetic ring and an upper and a lower ends of the outer circumferential wall of the inner magnetic ring having a magnetic strength less than that of a center of the outer circumferential wall. Therefore, the inner magnetic ring is rotatably restricted and located within the outer magnetic ring without upward or downward detaching therefrom.

9 Claims, 6 Drawing Sheets

MAGNETIC FLOATING BEARING OF A FAN, WHICH LOCATES ROTARY SHAFT BY MEANS OF DISTRIBUTION OF MAGNETIC FORCE

BACKGROUND OF THE INVENTION

FIELD OF THE INVENTION

The present invention is related to a magnetic floating bearing of a fan, in which by means of distribution of magnetic force, the rotary shaft fitted in an inner magnetic ring is restricted within an outer magnetic ring to rotate in a floating state.

A ball bearing or oil-bearing bearing is applied to a fan for reducing resistance against the rotary shaft of the fan. However, when rotated, there is still frictional force exerted onto the shaft to produce noise. FIG. 1 shows a magnetic floating bearing of a heat-radiating fan. The bearing includes a base seat 80 having an upright sleeve. At least one magnetic hollow cylinder 81 is annularly disposed on inner wall of the sleeve. In addition, at least one magnetic ring 82 is fitted around lower section of the rotary shaft 83 corresponding to the magnetic hollow cylinder 81. The magnetic ring 82 is repelled downward by the magnetic hollow cylinder 81. Accordingly, when the rotary shaft 83 is fitted into the upright sleeve, the rotary shaft 83 is kept pulled downward. When rotated, the magnetic ring 82 fitted around the rotary shaft 83 is not in contact with the magnetic hollow cylinder 81. However, the magnetic ring 82 is repelled downward by the magnetic hollow cylinder 81 so that the rotary shaft 83 is pushed downward and the bottom end 831 of the rotary shaft abuts against upper face of a board 84. Accordingly, when the rotary shaft 83 rotates, the board 84 will still exert a frictional force against the bottom end 831 of the rotary shaft 83. This will reduce rotational efficiency. Moreover, after a period of use, the bottom end 831 of the rotary shaft 83 and the board 84 will be worn out and the using life of the fan will be shortened.

FIG. 2 shows another type of conventional magnetic floating bearing structure including a magnetic rotary shaft coupling section 91 fixedly fitted around the rotary shaft 92 and projecting therefrom. The upper and lower ends of the coupling section 91 are formed with slopes 911. The bearing structure further includes a recessed magnetic locator coupling section 93 fixedly annularly fitted in the locator. The upper and lower ends of the locator coupling section 93 are formed with slopes 931. The slopes 931 and the slopes 911 of the rotary shaft coupling section 91 magnetically repel each other, whereby the rotary shaft 92 is rotatably restricted within a certain range. However, the slopes 911 of the rotary shaft coupling section 91 and the slopes 931 of the locator coupling section 93 must have equal inclination angle so as to exert equal upward and downward axial forces F1, F2 onto the rotary shaft 92 and make the rotary shaft coupling section 91 float between the locator coupling sections 93. Accordingly, the rotary shaft 92 can rotate without suffering frictional force. However, the manufacturing and assembling procedure of the magnetic floating bearing necessitates high precision so that the manufacturing cost is relatively high. Moreover, the rotary shaft coupling section 91 radially floats between the locator coupling sections 93 simply by means of the transverse component force created between the inner and outer slopes 911, 931. The transverse centrifugal force created when the fan rotates is the main force applied to the bearing. The transverse component force is quite limited and there is no support around the rotary shaft coupling section 91. Therefore, simply relying on the little transverse component force created between the inner and outer slopes 911, 931, the rotary shaft can hardly bear the transverse force when rotating at high speed. As a result, the rotary shaft will inevitably transversely severely shake.

SUMMARY OF THE INVENTION

It is therefore a primary object of the present invention to provide a magnetic floating bearing of a fan, which locates rotary shaft by means of distribution of magnetic force. The magnetic floating bearing includes: an outer magnetic ring formed with a central axial through hole, an upper and a lower ends of the wall of the through hole having a magnetic strength greater than that of a center of the wall; and an inner magnetic ring formed with a central axial fitting hole in which a rotary shaft is snugly fitted, the polarity of an outer circumferential wall of the inner magnetic ring being identical to the polarity of the wall of the through hole of the outer magnetic ring, an upper and a lower ends of the outer circumferential wall of the inner magnetic ring having a magnetic strength less than that of a center of the outer circumferential wall. The upper and lower ends of the wall of the through hole of the outer magnetic ring respectively exert greater magnetic repelling force onto the center of the outer circumferential wall of the inner magnetic ring. Therefore, the inner magnetic ring is rotatably restricted and located within the outer magnetic ring without upward or downward detaching therefrom.

The present invention can be best understood through the following description and accompanying drawings wherein:

DETAILED DESCRIPTION OF THE PREFERRED EMBODIMENTS

Figure 1:
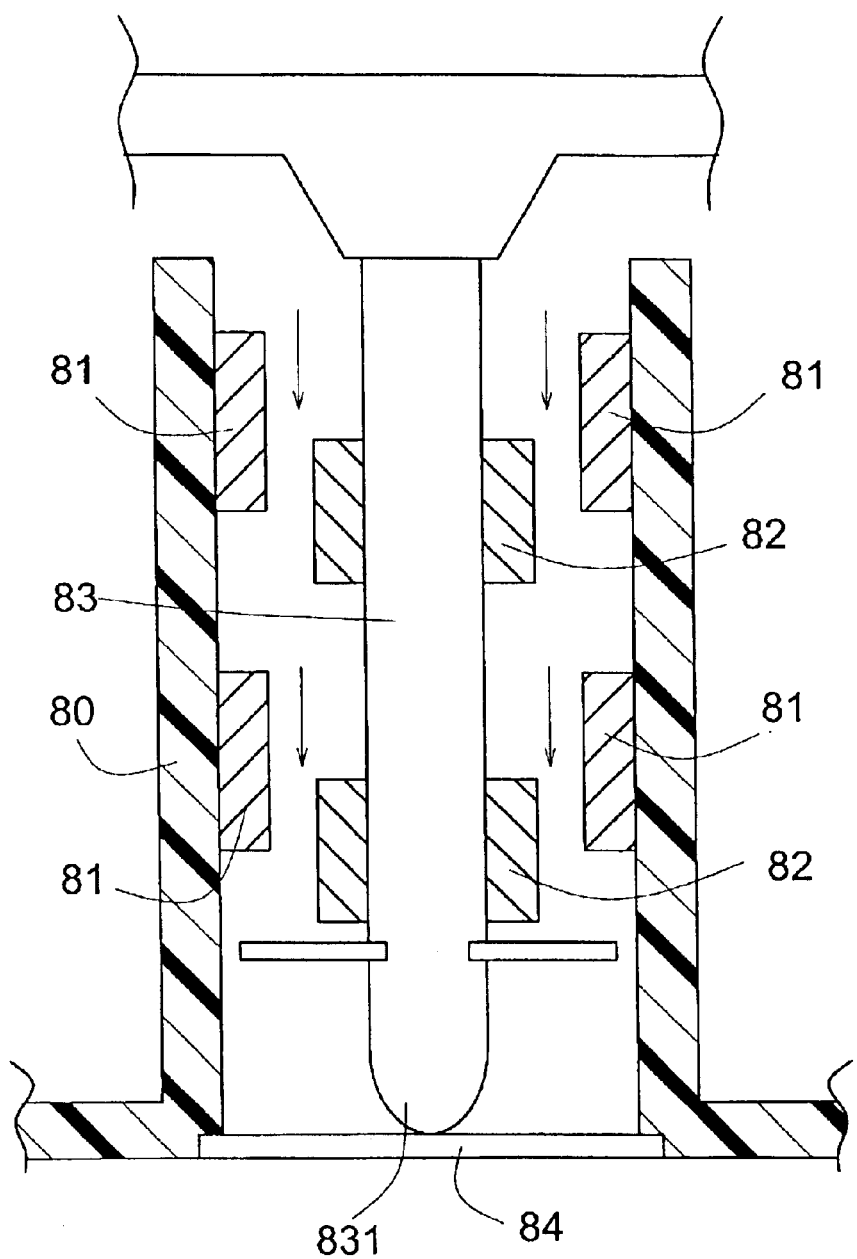
FIG. 1 is a sectional view of a conventional magnetic floating bearing.

Please refer to FIGS. 3 to 6. The magnetic floating bearing of a fan of the present invention includes an outer magnetic ring 1 formed with a central axial through hole 11. The upper and lower ends 11a, 11b of the wall of the through hole have a magnetic strength greater than that of the center 11c of the wall. The magnetic floating bearing further includes an inner magnetic ring 2 formed with a central axial fitting hole 20 in which a rotary shaft 5 is snugly fitted. The polarity of the outer circumferential wall 21 of the inner magnetic ring 2 is identical to the polarity of the wall of the through hole 11 of the outer magnetic ring 1. The upper and lower ends 21a, 21b of the outer circumferential wall have a magnetic strength less than that of the center 21c of the outer circumferential wall. Accordingly, the upper and lower ends 11a, 11b of the wall of the through hole 11 of the outer magnetic ring respectively exert greater magnetic repelling force onto the center 21c of the outer circumferential wall of the inner magnetic ring 2, whereby the inner magnetic ring 2 is rotatably restricted and located within the outer magnetic ring 1 without upward or downward detaching therefrom.

Figure 5:
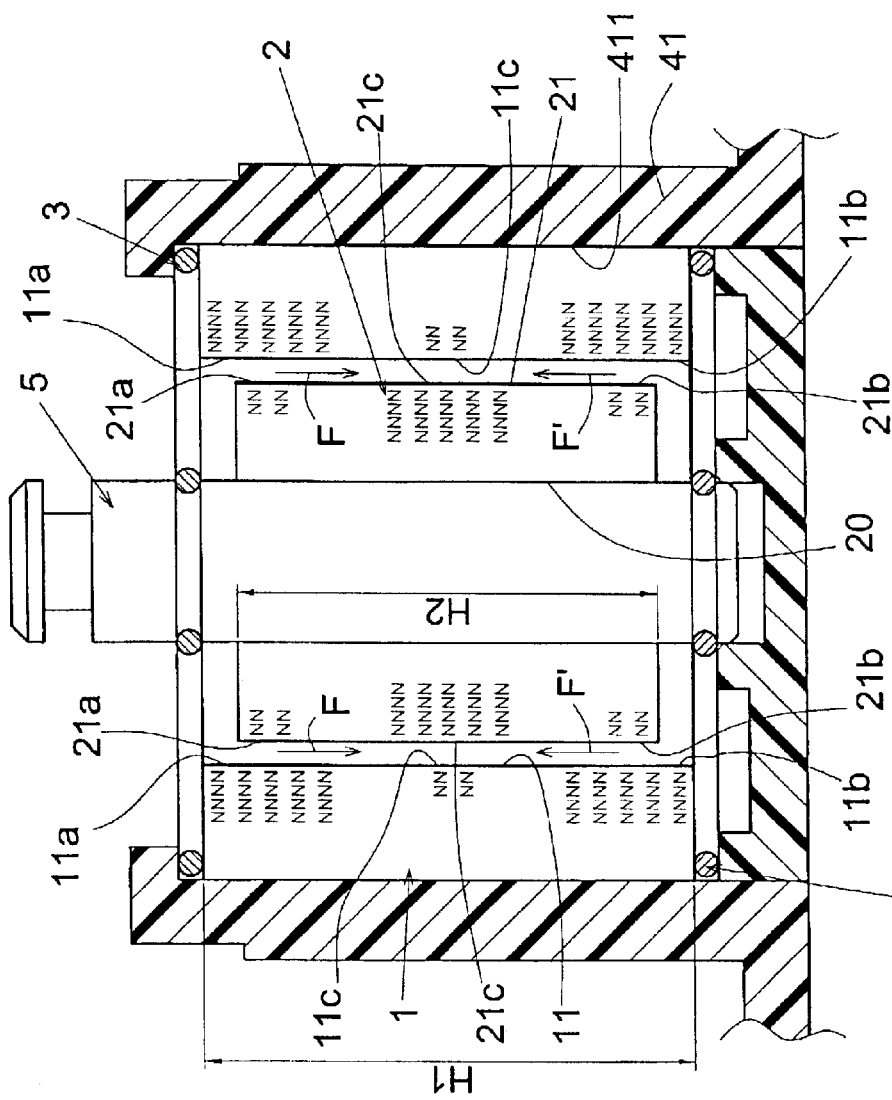
FIG. 5 is a sectional view of the present invention.

Referring to FIG. 5, the height H1 of the outer magnetic ring 1 is larger than the height H2 of the inner magnetic ring 2, whereby the upper and lower ends of the inner magnetic ring 2 will not protrude from the outer magnetic ring 1. Accordingly, the upper end 11a of the through hole of the outer magnetic ring 1 exerts a downward axial composite force F onto the upper end 21a of the inner magnetic ring 2. The lower end 11b of the through hole of the outer magnetic ring 1 exerts an upward axial composite force F' onto the lower end 21b of the inner magnetic ring 2. Accordingly, the inner magnetic ring 2 is rotatably restricted within the outer magnetic ring 1.

Referring to FIG. 5, the upper and lower ends 11a, 11b of the wall of the through hole of the outer magnetic ring 1 have a magnetic strength greater than that of the center 11c of the wall. In addition, the upper and lower ends 21a, 21b of the outer circumferential wall of the inner magnetic ring 2 have a magnetic strength less than that of the center 21c of the outer circumferential wall. Accordingly, when the inner magnetic ring 2 is rotated along with the rotary shaft 5 and tends to move upward, that is, when the center 21c of the outer circumferential wall of the inner magnetic ring 2 tends to get close to the upper or lower end 11a, 11b of the outer magnetic ring 1, because the center 21c of the outer circumferential wall of the inner magnetic ring 2 has stronger magnetic force, the upper or lower end 11a, 11b of the outer magnetic ring 1 will exert a greater magnetic repelling force onto the inner magnetic ring 2 and push the same back to its home position. Therefore, the inner magnetic ring 2 is prevented from upward or downward slipping out of the outer magnetic ring.

The upper and lower ends of the rotary shaft 5 can be respectively resiliently latched with two stop rings 3. The two stop rings 3 respectively abut against the upper and lower end faces of the outer magnetic ring 1 or a fixed article so as to define an axial sliding range of the rotary shaft 5. Alternatively, the stop rings 3 can be omitted and the axial sliding range of the rotary shaft 5 is simply restricted by the distribution of the magnetic force of the outer and inner magnetic rings 1, 2.

Figure 6:
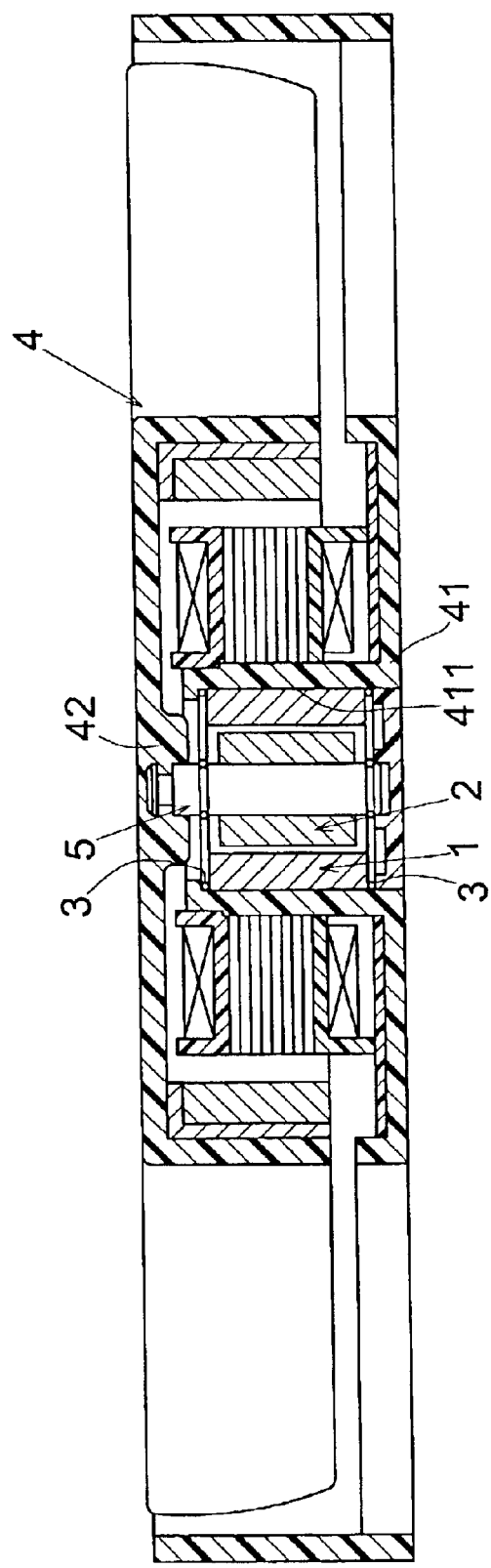
FIG. 6 is a sectional view showing that the present invention is applied to a heat-radiating fan.

Referring to FIG. 6, the present invention is applicable to a heat-radiating fan 4. The outer magnetic ring 1 is inlaid in a central fitting cavity 411 of the base seat 41 of the fan. A fan main body 42 is fitted on one end of the rotary shaft 5. In the magnetic floating bearing of the present invention, the inner magnetic ring 2 fitted around the rotary shaft 5 and the outer magnetic ring 1 magnetically repel each other without contacting with each other. By means of the distribution of the magnetic force of the outer and inner magnetic rings 1, 2, the inner magnetic ring 2 floats within the outer magnetic ring 1. Accordingly, the rotary shaft 5 also rotates in a floating state. Therefore, when the heat-radiating fan operates, the rotary shaft 5 is free from any frictional force so that no noise is produced and the using life of the heat-radiating fan is prolonged.

Figure 2:
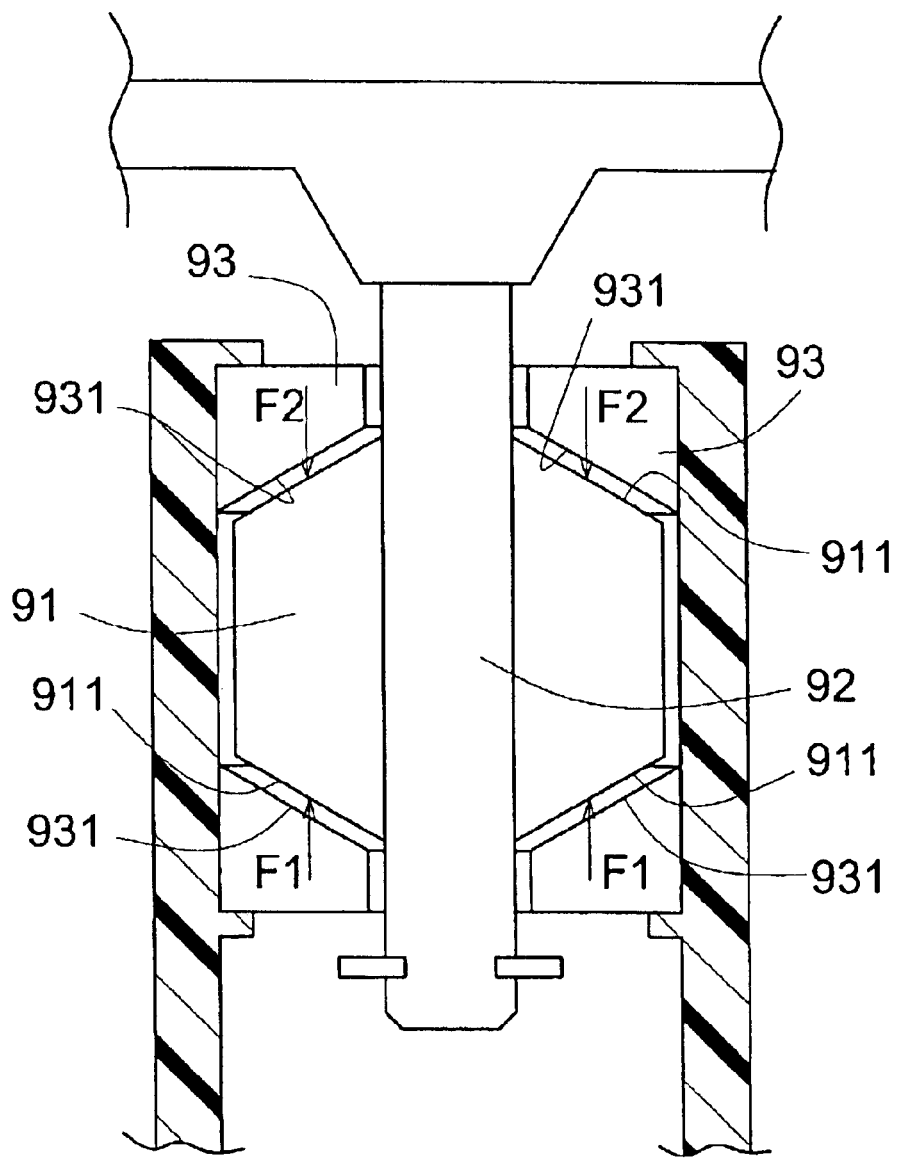
FIG. 2 is a sectional view of another type of conventional magnetic floating bearing.
Figure 3:
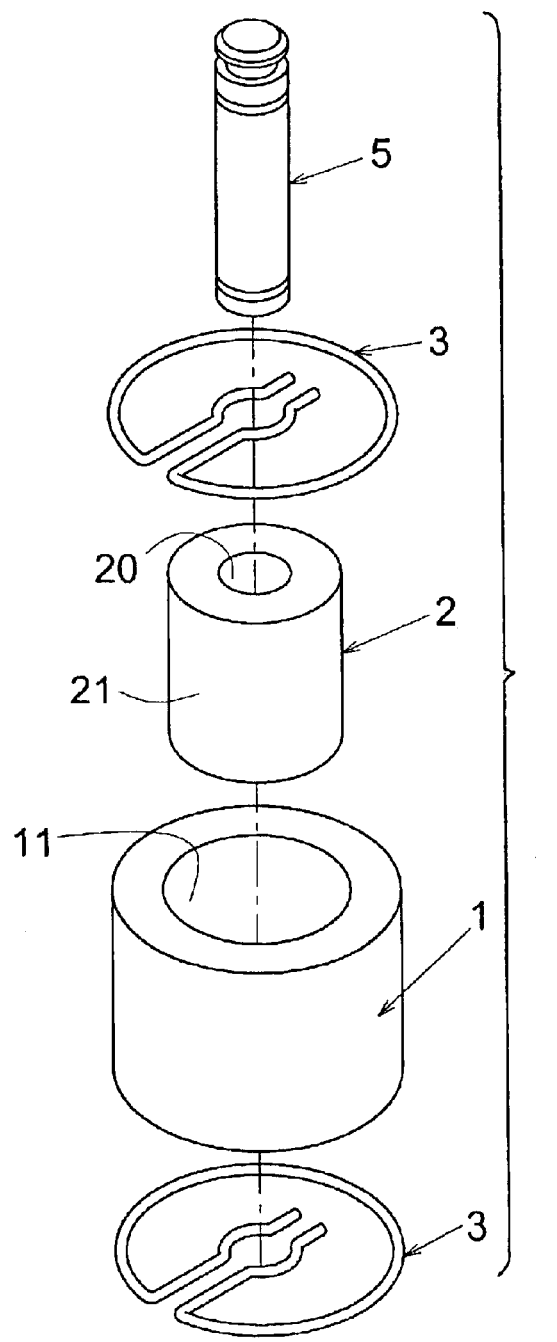
FIG. 3 is a perspective exploded view of the present invention.
Figure 4:
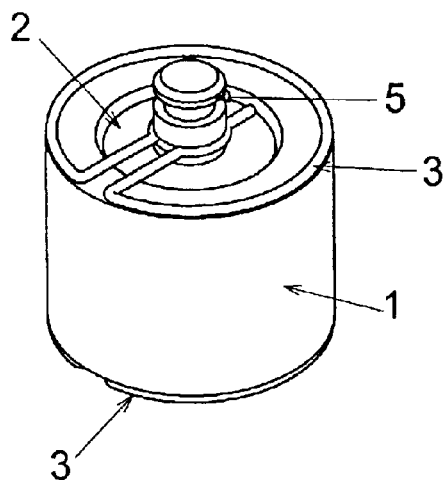
FIG. 4 is a perspective assembled view of the present invention.

The inner and outer magnetic rings 2, 1 have different distributions of magnetic force so that the inner magnetic ring 2 can float within the outer magnetic ring 1. This is different from the slope structure of the conventional device as shown in FIG. 2. Therefore, the present invention does not demand accurate processing and assembling operation. Accordingly, the manufacturing procedure is simplified and the manufacturing cost is reduced.

Figure 7:
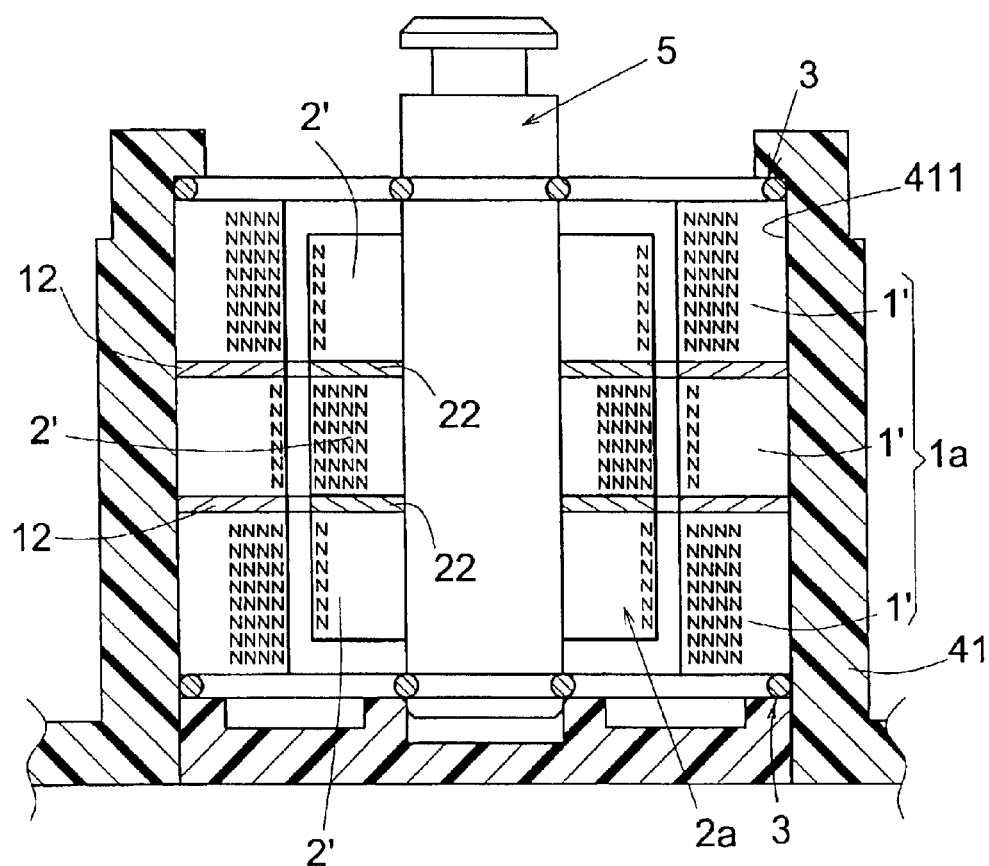
FIG. 7 is a sectional view of another embodiment of the present invention.

FIG. 7 shows another embodiment of the present invention, in which the outer magnetic ring 1a is composed of multiple layers of magnetic rings 1' which are piled. A spacer ring 12 is sandwiched between each two magnetic rings 1'. Accordingly, by means of different magnetic forces of the magnetic rings 1', the magnetic rings 1' can be assembled to form an outer magnetic ring 1a in which the upper and lower ends have a magnetic force greater than that of the center. The inner magnetic ring 2a is composed of multiple layers of magnetic rings 2' which are piled. A spacer ring 22 is sandwiched between each two magnetic rings 2'. Accordingly, by means of different magnetic forces of the magnetic rings 2', the magnetic rings 2' can be assembled to form an inner magnetic ring 2a in which the upper and lower ends have a magnetic force less than that of the center.

According to the above arrangement, the present invention has the following advantages:

1. The upper and lower ends 11a, 11b of the wall of the through hole of the outer magnetic ring 1 have a magnetic strength greater than that of the center 11c of the wall. The polarity of the outer circumferential wall 21 of the inner magnetic ring 2 is identical to the polarity of the wall of the through hole 11 of the outer magnetic ring 1. In addition, the upper and lower ends 21a, 21b of the outer circumferential wall 21 of the inner magnetic ring 2 have a magnetic strength less than that of the center 21c of the outer circumferential wall. By means of such distribution of magnetic force, the rotary shaft 5 fitted in the inner magnetic ring 2 rotates in a floating state within the outer magnetic ring 1. Therefore, the rotary shaft 5 is free from any frictional force so that no noise is produced.

2. It is easy to manufacture and assemble the present invention.

3. The manufacturing cost of the present invention is lower.

The above embodiments are only used to illustrate the present invention, not intended to limit the scope thereof. Many modification of the above embodiments can be made without departing from the spirit of the present invention.

What is claimed is:

1. A magnetic floating bearing of a fan, which locates a rotary shaft by means of distribution of magnetic force, said magnetic floating bearing comprising:

(a) an outer magnetic ring formed with a central axial through hole, upper and lower ends of a wall of the through hole having a magnetic field strength greater than that of a center of the wall; and (b) an inner magnetic ring formed with a central axial fitting hole in which a rotary shaft is snugly fitted, the polarity of an outer circumferential wall of the inner magnetic ring being identical to the polarity of the wall of the through hole of the outer magnetic ring, an upper and a lower ends of the outer circumferential wall of the inner magnetic ring having a magnetic field strength less than that of a center of the outer circumferential wall, whereby the upper and lower ends of the wall of the through hole of the outer magnetic ring respectively exert greater magnetic repelling force on the center of the outer circumferential wall of the inner magnetic ring and thus the inner magnetic ring is restricted within the outer magnetic ring to rotate in a floating state.

2. The magnetic floating bearing as claimed in claim 1, wherein a height of the outer magnetic ring is larger than a height of the inner magnetic ring.

3. The magnetic floating bearing as claimed in claim 1, wherein the upper and lower ends of the rotary shaft are respectively resiliently latched with two stop rings which respectively abut against the upper and lower end faces of the outer magnetic ring.

4. The magnetic floating bearing as claimed in claim 1, wherein the upper and lower ends of the rotary shaft are respectively resiliently latched with two stop rings which respectively abut against a fixed article.

5. The magnetic floating bearing as claimed in claim 1, wherein the outer magnetic ring is inlaid in a central fitting cavity of a base seat of the fan, a fan main body being fitted on one end of the rotary shaft.

6. The magnetic floating bearing as claimed in claim 1, wherein the outer and inner magnetic rings are respectively composed of multiple layers of magnetic rings which are piled.

7. The magnetic floating bearing as claimed in claim 6, wherein a spacer ring is sandwiched between each two adjacent layers of magnetic rings of the outer magnetic ring.

8. The magnetic floating bearing as claimed in claim 6, wherein a spacer ring is sandwiched between each two adjacent layers of magnetic rings of the inner magnetic ring.

9. The magnetic floating bearing as claimed in claim 6, wherein the upper and lower ends of the rotary shaft are respectively resiliently latched with two stop rings which respectively abut against a fixed article.

* * * * *